United States Patent [19]

Rose et al.

[11] Patent Number: 5,470,105
[45] Date of Patent: Nov. 28, 1995

[54] DIFFUSER DEVICE AND INCORPORATION THEREOF IN AN INFLATABLE RESTRAINT SYSTEM

[75] Inventors: Larry D. Rose, Layton; Donald R. Lauritzen, Hyrum; Mike J. Ravenberg, Corinne; Mark A. Thompson; David J. Green, both of Brigham City; Terry R. Davis, Layton, all of Utah

[73] Assignee: Morton International, Inc., Chicago, Ill.

[21] Appl. No.: 993,277

[22] Filed: Dec. 18, 1992

[51] Int. Cl.⁶ ................................................. B60R 21/28
[52] U.S. Cl. .................................... 280/740; 280/728.1
[58] Field of Search ...................... 280/728 R, 728 A, 280/740, 743 R, 741 R

[56] References Cited

U.S. PATENT DOCUMENTS

| | | | |
|---|---|---|---|
| 3,708,181 | 1/1973 | Mazelsky | 280/150 |
| 4,111,457 | 9/1978 | Kob et al. | 280/728 |
| 4,136,894 | 1/1979 | Ono et al. | 280/729 |
| 4,941,678 | 7/1990 | Lauritzen et al. | 280/732 |
| 4,986,569 | 1/1991 | Bruton | 280/743 |
| 5,058,919 | 10/1991 | Paquette et al. | 280/732 |
| 5,060,974 | 10/1991 | Hamilton et al. | 280/741 |
| 5,062,664 | 11/1991 | Bishop et al. | 280/743 |
| 5,069,480 | 12/1991 | Good | 280/743 |
| 5,131,680 | 7/1992 | Coultas et al. | 280/737 |
| 5,184,843 | 2/1993 | Berger et al. | 280/728 A |
| 5,186,592 | 2/1993 | Wright et al. | 280/728 A |

FOREIGN PATENT DOCUMENTS

| | | | |
|---|---|---|---|
| 25734/71 | 11/1972 | Australia . | |
| 4169356 | 6/1992 | Japan | 280/728 A |
| 2247214 | 2/1992 | United Kingdom | B60R 21/16 |
| 2246984 | 2/1992 | United Kingdom | 280/728 A |

Primary Examiner—Eric D. Culbreth
Attorney, Agent, or Firm—Nick C. Kottis; Gerald K. White

[57] ABSTRACT

A diffuser device, an air bag/diffuser subassembly and an air bag module assembly for use in an inflatable air bag restraint system for use in a motor vehicle are provided. The diffuser device can function as a structural member, gas flow diffuser, heat shield and bag retainer and can serve to reduce the cost/weight of air bag module manufacture and assembly.

21 Claims, 8 Drawing Sheets

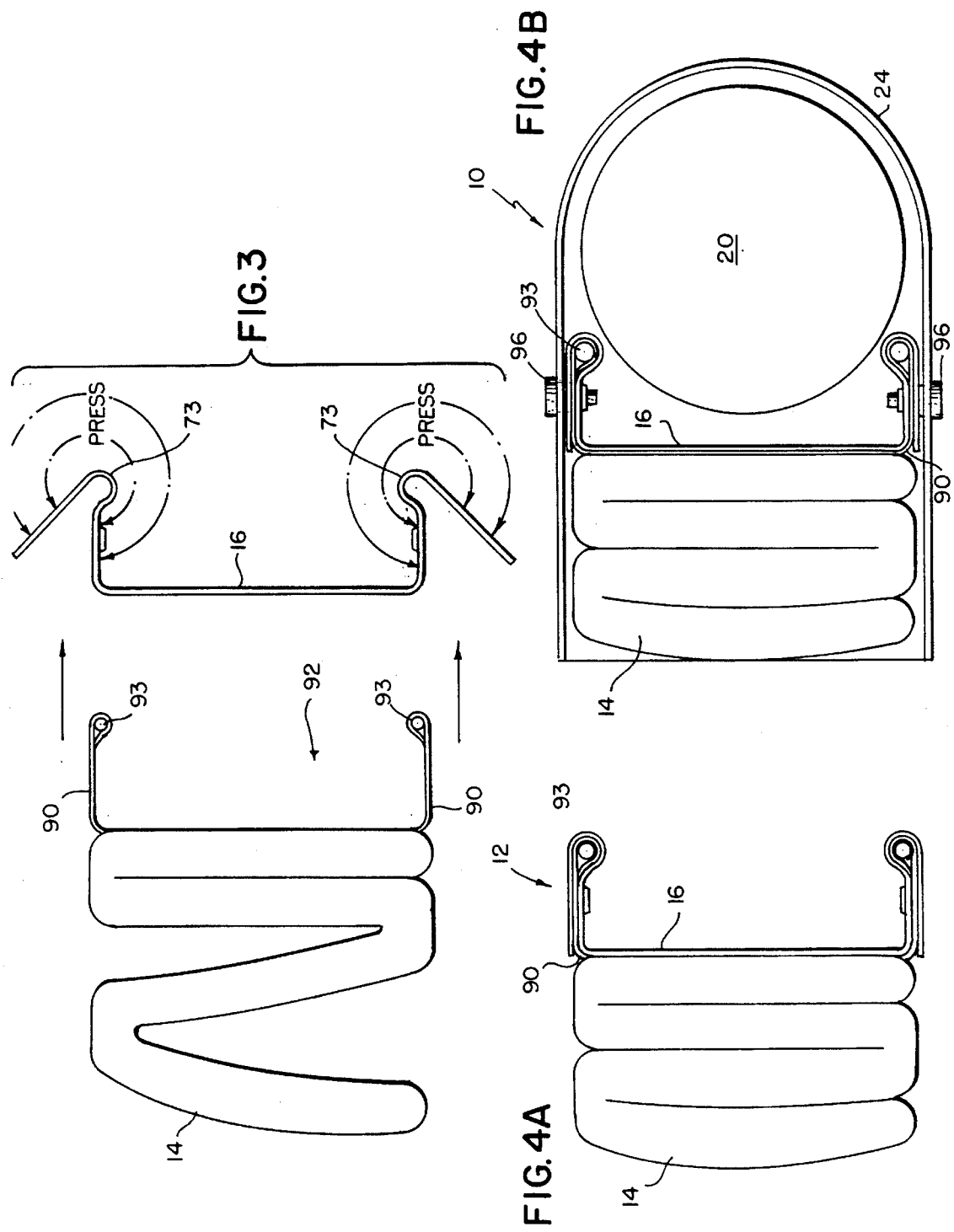

DIFFUSER DEVICE AND INCORPORATION THEREOF IN AN INFLATABLE RESTRAINT SYSTEM

BACKGROUND OF THE INVENTION

This invention relates generally to systems for the passive restraint of vehicle occupants and, more particularly, to a diffuser device and combinations therewith used in such inflatable restraint systems.

Safety restraint systems which self-actuate from an undeployed to a deployed state without the need for intervention by the operator, i.e., "passive restraint systems" and particularly those restraint systems incorporating inflatable bags or cushions, as well as the use of such systems in motor vehicles have been the subjects of much discussion as the desirability of the use of such passive restraint systems has gained general acceptance in the United States.

It is well known to protect a vehicle occupant using a cushion or bag that is inflated with gas, e.g., an "air bag" when the vehicle encounters sudden deceleration, such as in a collision. The term "air bag" is something of a misnomer, however, as during deployment the rapidly evolving gas with which the bag is filled is typically not air but rather an inert gas, e.g., nitrogen. In such systems, the air bag is normally housed in an uninflated and folded condition to minimize space requirements. In an emergency, gas is discharged from an inflator to rapidly inflate the air bag. The air bag, upon inflation, serves to restrain the movement of the vehicle occupant as the collision proceeds. In general, such air bags are commonly designed to be inflated in no more than about 45–60 milliseconds.

Vehicular inflatable restraint systems generally include multiple crash sensors generally positioned about or mounted to the frame and/or body of the subject vehicle and serve to sense sudden decelerations by the vehicle. In turn, the sensor sends a signal to an air bag module or assembly strategically positioned within the riding compartment of the vehicle to actuate deployment of the air bag. In general, an air bag provided for the protection of a vehicle driver, i.e., a driver side air bag, is mounted in a storage compartment located in the steering column of the vehicle. Whereas, an air bag for the protection of a front seat passenger, i.e., a passenger side air bag, is typically mounted in the instrument panel/dash board of the vehicle.

Typical air bag restraint systems make use of an air bag module which generally includes an outer reaction housing or canister, commonly referred to as a "reaction can" or, more briefly, as a "can". The reaction can generally serves to support or contain other components of the air bag module system, including what is referred to as a "air bag inflator" or, more briefly, as an "inflator" or alternatively, as a "generator". The inflator, upon actuation, acts to provide the gas to inflate the air bag.

The inflator used in such a system is typically either of a pyrotechnic or hybrid type. Pyrotechnic inflators generally contain a gas generating material which, upon activation, generates gas used to inflate the air bag. In general, the inflation gas produced by a pyrotechnic inflator is emitted from openings or emission ports along the length of the inflator. In contrast, hybrid type inflators in addition to a body of ignitable pyrotechnic material generally contain as the primary inflation gas a stored, compressed gas which, upon proper actuation, is expelled from the inflator. As a consequence of the physics associated with the storage of compressed gases, the container used to store this compressed gas typically has a cylindrical shape. Furthermore, the discharge of gas from such a cylindrically shaped gas storage container typically occurs by way of openings or emission ports at only one end of the cylindrical container. To attain proper bag deployment, however, it is generally desired that the emission of gas into the air bag from such a storage container be done in a fairly uniform manner. With typical air bag/inflator assemblies, such uniform emission is generally attained by having a relatively even emission of gas into the deploying bag along the length of the gas inlet opening of the air bag connected, directly or indirectly, to the inflator. In this way the bag is properly uniformly deployed and the risk of the bag deploying in a skewed manner due to the discharge of gas from only one end of the storage container is avoided.

Upon inflation and deployment of the air bag, the reaction housing canister acts to absorb or retransmit the resulting air bag deployment forces to the vehicle. The reaction housing typically is an open-mouthed container into which the air bag, in an uninflated and folded condition, is also placed. In prior art devices the air bag is commonly attached either about the inflator or to the reaction housing itself. As a consequence of such attachment, the reaction housing is especially susceptible to deformation as a result of the forces produced during and associated with bag deployment. For example, when the air bag is inflated the peripheral portion of the opening of the air bag is typically pushed outwardly with respect to the housing oftentimes resulting in deformation of the housing. By virtue of the open-mouth shape or form generally taken by these reaction housings such deformation is generally referred to as "bell-mouthing".

In order to resist such deformation and to prevent the peripheral portion of the gas inlet opening of the air bag from moving outwardly with respect to the housing, conventional air bag devices have adopted various measures.

In practice, bell-mouthing can be reduced or limited by making the reaction housing using a metal of greater thickness and/or strength. Such use of a thicker metal, however, can result in a significant and detrimental increase in the overall weight of the housing. Of course, weight minimization is an especially important concern in modern vehicle design as a result of the impact the weight of a vehicle has on vehicular fuel mileage. The alternative of fabricating the reaction housing using a stronger type of material of construction is not always practical as stronger materials of construction generally have higher material costs associated with them and would thus increase the cost associated with such safety restraint systems.

Commonly assigned U.S. Pat. No. 4,941,678, Lauritzen et al., issued Jul. 17, 1990, discloses a lightweight housing canister assembly having a design avoiding such bell-mouthing. The assembly includes a tether strap, at the mouth inside the bag, that restricts the loading of the reaction canister and positioned transversely thereto. This tether strap retains the spreading forces at the mouth of the canister upon bag deployment. This allows the use of a lighter section at the mouth of the canister and eliminates the need for reinforcing flanges along the sides of the canister, which flanges would undesirably increase the weight of the assembly. For retaining the bag in the assembly, the patent discloses that notches formed on the inner side of each of the walls of the reaction canister body form a bag retaining ring shelf for retaining a continuous attachment ring formed at the gas inlet opening of the inflatable bag.

U.S. Pat. No. 5,131,680 discloses a type of hybrid inflator and includes a diffuser. The disclosed inflator assembly includes a generally cylindrical container, a generally cylindrical diffuser, and a manifold assembly, secured to one end of the container. The diffuser is larger in diameter than container and is mounted to encircle both the container and the manifold assembly. Further, the diffuser, which has openings through which the gas is directed to the air bag, extends substantially the entire length of the manifold assembly and a significant portion of the length of the container. Because this diffuser encircles both the container and the manifold assembly and must be able to withstand the stresses applied thereto during operation, such diffusers are generally more bulky and weighty than would be preferred.

In addition, there are a number of U.S. patents that at least in part relate to air bag retention and/or conveyance of the inflating gas into the air bag.

For example, U.S. Pat. No. 4,986,569 discloses an air bag attachment system comprising a canister having a shoulder on a peripheral edge flange for seating of a metal rod disposed in a channel in the air bag. The edge flange of the canister is reentrantly folded about the rod to retain the air bag on the canister.

U.S. Pat. No. 5,069,480 discloses an air bag retainer assembly which includes a pillow or air bag assembly including a pillow retainer to which is attached an inflatable pillow or air bag and which retainer is secured to the reaction housing assembly. Gas, supplied by a gas generator, will flow upon activation through openings provided in the retainer and into the pillow or air bag. The air bag is attached to the retainer by means of a V-shaped hem sewn about the end of the bag. Upon movement of the hem and air bag forward, the open side of the V-shaped hem engages and envelopes the circumferential edge of the retainer.

Examples of other such patents include: U.S. Pat. No. 3,708,181 which specifies the use of a nozzle through which pressure is transferred from a gas tank to an inflatable bag with the tank and nozzle joined together by way of tongue and groove joints while a continuous, flexible resilient holding member holds the edge portions of the bag in position in a groove formed around the nozzle discharge; U.S. Pat. No. 4,111,457 which discloses the use of a clamping ring to secure the edge of an air bag to the housing of the inflatable restraining device; U.S. Pat. No. 4,136,894 which discloses the use of an apertured diffuser to cover each of three independent gas generant-containing chambers of a specifically designed housing; U.S. Pat. No. 5,062,664 which specifies a hollow cylindrical member or canister having an opening into which a gas generator is inserted and having the open end of the air bag envelope the cylindrical member; and U.S. Pat. No. 5,058,919 which discloses an air bag module construction and assembly technique wherein a screen-shaped member is used to retain a folded air bag in the housing.

Nevertheless, a low weight and low cost solution to the problems of bell-mouthing and uniform gas distribution and bag deployment is still desired.

In practice, the component parts of such inflatable restraining devices, particularly the inflatable air bag and the housing, are joined and held together by means of selected fasteners such as screws, rivets or bolts. For example, a selected fastener is typically passed through fastener holes which have been preformed in the respective parts to be fastened together. Unfortunately, a problem frequently experienced in the assembly of these inflatable restraining units is difficulty in achieving and maintaining desired and proper fastener hole alignment of the respective parts to be fastened together. Also, in order to avoid undesired point loading of the stresses generated upon bag deployment, it is generally preferred to secure or fasten the bag into the assembly by means of fastening the bag between two load bearing materials (e.g., metals), such as between the reaction canister and metal retaining flanges or a metal ring placed about the bag gas inlet opening, for example. In this way, undesired loading of bag deployment stresses at or about the fastener holes in the bag fabric is reduced and preferably avoided.

In general, such fastening is done through the reaction canister itself, thereby simplifying the assembly process as the canister, bag and metal retaining flanges or metal ring are all simultaneously fastened together by means of such fastening. Unfortunately, it is difficult to simultaneously maintain proper alignment of the fastener holes in the canister, bag and retaining flange as the fastener holes in the relatively flexible bag material tend to become easily displaced relative to the fastener holes in the canister and/or retaining flange. As a result, an assembly worker must either be dedicated to maintaining the fastener holes in proper alignment or else a worker will have to stop whatever else that worker was doing in order to realign the fastener holes in the bag with the fastener holes in the canister and in the retaining flange. This of course slows and increases the cost of the assembly process. Further, a requirement for human intervention to reeffect proper fastener hole alignment prevents implementation of a more fully automated assembly process.

Thus, a relatively simple, low cost bag attachment and retaining mechanism whereby the fastener holes in the air bag are maintained in alignment with the fastener holes in adjacent members and which mechanism permits an easy adaptation to automated production and assembly is desired.

Air bag inflators commonly have associated with them an electrically actuatable igniter which upon actuation, in the case of a pyrotechnic type inflator as described above, ignites a gas generating material contained within the inflator. As the gas generating reaction is typically highly exothermic, a large amount of heat is generally produced during the gas generation process. Of course, human contact with this heat, either directly or indirectly by contact with surface(s) heated as a result of direct contact by the heat, is desirably to be avoided. Also, contact by the air bag with the hot gases by the inflator can itself cause damage to the air bag and result in the malfunctioning of the air bag. For example, in designs wherein the air bag is packed adjacent the inflator, during the short time interval immediately following the onset of actuation, the inflator can discharge gases at both such a high rate of speed and in such a fashion whereby the gases directly impinge relatively small areas of the interior surface of the air bag, and the bag itself can suffer some type of degradation such as having a hole burned through it and thereby prevent the proper functioning of the system.

Thus, a system which allows for safe air bag deployment, including the safe dissipation of heat generated during the deployment process, without harm to the occupants of the vehicle either via the cause for the deployment of the air bag, e.g., a "crash" by the vehicle, or through the bag deployment process itself, is desired.

In addition, reducing the size and weight of air bag module assemblies is important to facilitate the incorporation of such assemblies in various makes and styles of vehicles without significantly detrimentally effecting either the fuel mileage or the appearance of the vehicle.

Also, assembly designs which facilitate production and which allow for unobtrusive product quality checks are important aspects in the modern competitive economic world environment.

Thus, an easy to assemble, light weight, small and relatively inexpensive air bag module assembly is desired.

SUMMARY OF THE INVENTION

The general object of the invention is to provide an improved diffuser device.

A more specific objective of the invention is to overcome one or more of the problems described above.

The general object of the invention can be attained, at least in part, through a diffuser device having a face member, an outer flange, and a channel portion adapted to engage a thickened edge of an air bag. The face member has a longitudinal length, a peripheral edge defined thereabout, and an integrally formed side wall about at least a portion of the peripheral edge. The outer flange is positioned oppositely and angularly disposed relative to at least a portion of the side wall. The channel portion bridges the side wall and the oppositely positioned and angularly disposed outer flange. The diffuser device includes gas flow directing means including a plurality of apertures in the face member permitting gas to flow through the face member. Further, the longitudinal length of the face member is generally perpendicular to the direction of gas flow through the face member.

In one embodiment, a diffuser device in addition to an outer flange and a channel portion adapted to engage a thickened edge of an air bag, further includes a face member having an angular cross section and having a longitudinal length which is generally perpendicular to the direction of gas flow through the member. The face member also has a topside, an underside, at least two opposed lateral sides and at least two opposed longitudinal sides, with a peripheral edge defined about said lateral and longitudinal sides. The face member includes an integrally formed side wall about at least a portion of the peripheral edge and also includes gas flow directing means including; a) a plurality of apertures therethrough to permit gas to flow through the member, and b) at least one baffle formed onto the underside of the face member. The baffle arrangement serves to redirect gas flow through the member and thus through the device.

The invention further comprehends an air bag/diffuser subassembly for use in an inflatable air bag restraint system for use in a motor vehicle. The subassembly includes a diffuser, such as described above, and an inflatable air bag having a thickened edge at its opening. The thickened edge of the inflatable air bag is engaged by the channel portion of the diffuser.

The invention still further comprehends an air bag module assembly comprising an air bag subassembly, such as described above, means for inflating the bag, a housing containing the air bag subassembly and bag inflating means, as well as means for securing the housing in the motor vehicle.

Other objects and advantages of the invention will be apparent to those skilled in the art from the following detailed description taken in conjunction with the appended claims and drawings.

BRIEF DESCRIPTION OF THE DRAWINGS

FIG. 3 is a simplified exploded schematic cross sectional view of an air bag/diffuser subassembly, in accordance with one embodiment of the invention.

FIG. 4A is a simplified cross sectional view showing an air bag/diffuser subassembly.

FIG. 4B is a simplified cross sectional view showing an air bag/diffuser subassembly inserted into a reaction housing to form an air bag module assembly, according to one embodiment of the invention.

DETAILED DESCRIPTION OF THE INVENTION

According to the invention, a specially constructed and designed diffuser device, described herein, is used in air bag module assembly. The diffuser device, in addition to fostering desired gas diffusion as its name indicates, can also assist in: 1) facilitating module assembly; 2) maintaining proper bag retention within the assembly, and 3) maintaining desired separation of the hot inflator surfaces from both the surface of the air bag as well as from contact by the vehicle occupants. In addition, the diffuser device, as used, can serve to control bell-mouthing of the reaction canister, thereby assisting in maintaining the integrity of the reaction canister.

While the invention will be described below with reference to a passenger side air bag module assembly for automotive vehicles including vans, pick-up trucks, and particularly automobiles, it is to be understood that the invention also has applicability not only with other types or kinds of air bag module assemblies for automotive vehicles including driver side assemblies, but also other types of vehicles including, for example, airplanes. With respect to automotive vehicles it will also be appreciated that due to usual physical differences between passenger and driver side air bag module assemblies, including the typical difference in size with passenger side air bags generally being much larger than those used in driver side assemblies, the invention has particular utility in passenger side air bag module assemblies.

Figure 1:
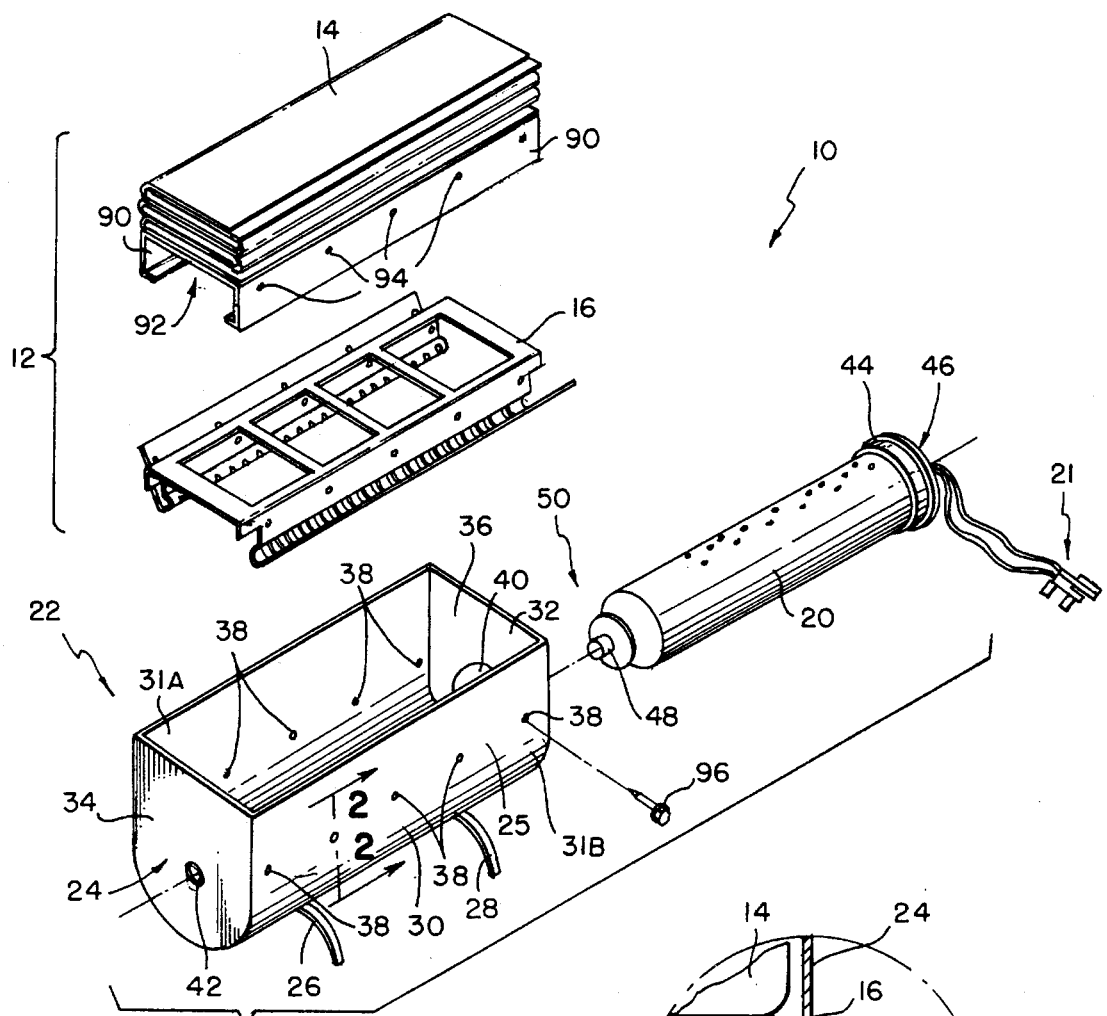
FIG. 1 is a partially exploded perspective view of an air bag module assembly, in accordance with one embodiment of the invention.
Figure 2:
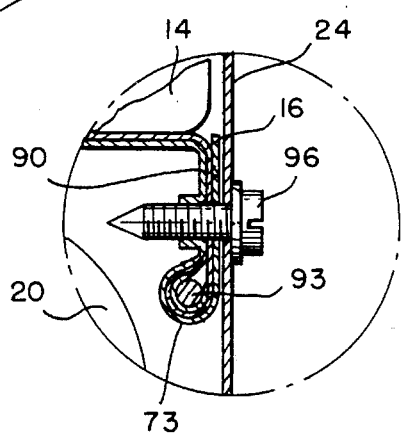
FIG. 2 is an enlarged cross sectional view taken along line 2—2 of FIG. 1 and viewed in the direction of the arrows of the assembled air bag module assembly.

Referring initially to FIG. 1, an exploded perspective view of an air bag module assembly, generally designated 10, is shown. The air bag module assembly 10 is a self-contained unit, the primary components of which include an air bag/diffuser subassembly 12 of a folded air bag 14 and a diffuser 16, a gas generator or inflator 20 with associated wiring/connections 21 to permit, for example, connection of the inflator with other to the crash sensors (not shown) and an air bag module enclosure 22.

The enclosure 22 generally includes a reaction housing assembly shown as a reaction canister or "can" 24. It is to be understood that while the practice of the invention is not limited to use in conjunction with reaction canisters made of particular materials of construction, because of a desire to practically reduce and/or minimize the cost and weight of the assembly, reaction canisters are typically made of steel or, preferably, aluminum either in a formed, cast or extruded shape. It is to be further understood that the construction of the reaction canister using other suitable materials of construction such as molded plastic, for example, are also contemplated.

During fabrication, the completed air bag/diffuser subassembly 12 is preferably assembled as a unit and, as will be described in more detail below, safely secured to the reaction housing 24. The exterior 25 of the reaction canister 24 has attached thereto installation brackets 26 and 28 provided for facilitating the installation of the module 10 in the instrument panel of the vehicle. It is to be understood that in the practice of the invention, the reaction housing can be secured to an appropriate cooperating portion of the vehicle such as the instrument panel, such as used for typical passenger side module installations, or the steering wheel, such as commonly used for driver side module installations. It is also to be understood that other or additional appropriate attachment means such as brackets, flanges or bars, for example, such as on the exterior of the reaction housing can be used to facilitate attachment of the module to the vehicle as required for particular installations. It will also be appreciated that for some particular installations the reaction housing itself will be adapted to permit installation without the use of any such supplemental attachment means.

Either, as a part of the air bag module assembly or separately, a cover or a door (not shown) is generally provided. Such a cover or door is generally designed to provide closure to the canister. In practice, such doors are typically made of plastic or a metal substrate with a plastic or other cover layer of material typically selected to match or be similar to the material of the outer surface of either the steering wheel (in the case of driver side assembly application) or, the instrument panel (e.g., in the case of a typical passenger side application).

As shown in FIG. 1 the reaction housing 24 includes a first member 30. As shown, the first member can have a roll-form shape and includes side panels 31, shown as first and second side panels 31A and 31B, respectively. Also, the reaction housing assembly 24 includes first and second end plates 32 and 34, respectively. Upon assembly of the reaction housing 24, the first member 30 and the end plates 32 and 34 cooperate to define an open mouth generally shown as 36. The mouth is typically rectangular in shape but it is to be understood that other shapes or forms including, for example, round, oval, and square, can be appropriately used as such shapes or forms can satisfy the needs for particular installations without departing from the invention. In addition, the side panels 31A and 31B each include one or more fastener holes 38 in spaced relationship, the use of which fastener holes in the assembly process will be described in more detail below.

The first end plate 32 includes a clearance opening 40 compatible with and into which is received the gas generator/inflator 20. As described above, typical inflators have a generally cylindrical shape or form. With the use of a cylindrically shaped inflator, the clearance opening 40 in the first end plate 32 will generally be circular in shape. Consistent with the invention, however, it is to be understood that the shape of the opening in the end plate can be appropriately altered to be compatible with inflators of various shapes and sizes. The shown inflator 20 has an elongated cylindrical configuration and is retained in the reaction housing assembly 24 between the first and second end plates, 32 and 34. As shown, in addition to the circular opening 40 provided in the first end plate 32, a smaller opening 42 of a keyed slot is provided in the second end plate 34. Also, as shown, a flange 44 is provided on a first end 46 of the inflator 20 while a threaded keyed stud 48 is provided on the second end 50 of the inflator 20. The size of the opening 40 in the first end plate 32 is such as to allow the inflator 20 to be inserted therein in a snug fit. Similarly, the size of the keyed opening 42 in the second end plate 34 is such as to snugly receive the stud 48 on the second end 50 of the inflator 20. It is, of course, to be understood that while such use of a stud because of its simplicity and ease of assurance of positive attachment, is a generally preferred means by which to secure an inflator therein, the use of other means of securing an inflator are contemplated and can be used in conjunction with the practice of the invention.

As can also be seen by reference to FIGS. 3, 4A and 4B, the air bag module assembly 10 further includes the air bag/diffuser subassembly 12 comprising the diffuser 16 and the inflatable air bag 14. Referring again to FIG. 1, the diffuser 16, as illustrated, has a generally rectangular shape to conform with the generally rectangular mouth opening 36 in the reaction canister 24. It should be appreciated, however, that other shapes and forms such as may be required to conform with variously shaped canister mouth openings, as discussed above, are within the scope of the present invention.

As can be seen more clearly by reference to the diffuser drawings, FIGS. 5–11, wherein similar features are given the same reference numerals and generally will not be individually described in detail, the diffuser 16 includes a face member 52 having a topside 54, an underside 56, two opposed lateral sides 60A and 60B, respectively, two opposed longitudinal sides 64A and 64B, respectively, a longitudinal length 66, a peripheral edge 67 defined about the lateral and longitudinal sides 60 and 64, respectively, and an integrally formed side wall 68, shown as the side walls 68A and 68B. Each of the side walls 68A and 68B has a bottom section 69, shown as bottom sections 69A and 69B, respectively. The side walls 68A and 68B are about the peripheral edge 67 at the longitudinal sides 64A and 64B, respectively.

The face member 52 includes gas flow directing means whereby the flow of gas through the member and thus through the diffuser device and into the air bag can be directed as the bag is inflated. As shown, these gas flow directing means include, for example, a plurality of apertures 70 through the face member 52 to permit a gas to flow through the member 52, from the underside 56 to the topside 54, and thus through the device 16. In general, the longitudinal length 66 of the face member 52 is generally perpendicular to the direction of gas flow through the diffuser 16.

The diffuser 16 also includes an outer flange 72, shown as outer flanges 72A and 72B, positioned oppositely and angularly disposed relative to the side walls 68A and 68B, respectively, and a channel portion 73, shown as channel portions 73A and 73B. Each of the channel portions 73A and 73B bridge respective side walls 68A and 68B and outer flanges 72A and 72B. In practice, it has been found advantageous to include bend line perforations 75 along the channel portion 73 in order to facilitate controlled bending of this portion of the diffuser. Preferably, the bend line perforations, such as holes or slots, for example, are situated off-centered towards the outer flange 72 side of the channel portion 73 so that the channel preferably remains generally circular in cross section after crimping, as described herein. Such bend line perforations can easily be created, such as by appropriately punching a sheet material used in the making of the diffuser, for example. Such bend line perforations facilitate the crimping or pressing together of the outer flange 72 and side wall 68, such as is preferably done during the assembly process, as will be described in more detail below.

The outer flange 72 defines a top edge 78, shown as top edges 78A and 78B, and an opposing bottom edge 80, shown as bottom edges 80A and 80B. The channel portion 73 defines opposite first and second edges 82 and 84, respectively, with the first edge 82 adjoining the bottom section 69 of the side wall 68 and the second edge 84 adjoining the bottom edge 80 of the outer flange 72.

The gas flow directing means of the diffuser, in addition to apertures, also may optionally include one or more and, preferably, two to five baffles 85 to assist in the directing of the gas flow. While such baffled diffusers can in general be used in conjunction with any type of inflator, baffled diffusers are particularly beneficial and preferred for use in conjunction with hybrid type inflators which, as described above, commonly discharge stored gas from only one end thereof. In such use, the baffles can serve to prevent undesired gas flow channeling through the diffuser, which channeling if uncorrected can result in undesired unsymmetrical bag deployment.

In the broader practice of the invention, diffusers can be used with or without baffles. Thus FIGS. 1, 2, 3, 4A and 4B illustrate a diffuser without baffles while the diffuser embodiments illustrated in FIGS. 5–11 all contain some shape or form of baffle(s).

Both the side walls 68A and 68B and the outer flanges 72A and 72B each include one or more fastener holes 86 and 88, respectively, in spaced relationship and spaced to correspond to the fastener holes 38 of the housing side panels 31A and 31B.

Typically, the diffuser will be fabricated from a ductile sheet material, typically a metal sheet material, such as steel or aluminum (either formed or extruded, for example), with steel, particularly low carbon steel, generally being preferred due to its relatively greater structural strength, ease of use and comparatively low cost. It is to be understood, however, that the diffuser of the invention can be fabricated of any suitable material, that is, the diffuser can be made of any material capable of withstanding and properly operating under the conditions of use associated with such inflatable restraining systems including temperature, such as temperatures of up to about 1000° F., as can be realized with modules containing certain types of inflators.

In a particularly preferred method of fabrication, a single flat pattern of a selected material of construction, such as a sheet of steel or aluminum, for example, is used and by means of selectively bending and appropriately cutting or punching the metal sheet, the final form of the diffuser device is achieved.

As may be more clearly seen in FIGS. 3, 4A and 4B, the air bag 14 has a thickened edge 90 about its inlet opening 92. Various modes of thickening the bag edge are contemplated and include, for example, simply folding the air bag over itself to form a thickened edge and hemming the gas inlet opening of the air bag to form a loop or channel into which a bead material 93 is placed.

While, it is of course to be understood that alternative means of edge thickening can be used without departing from the practice of the subject invention, the hemming of the bag gas inlet opening to form a loop into which a bead material is placed is a generally preferred thickening means because the use of such a thickening means tends to ensure positive engagement with the channel portion of the diffuser. Furthermore, the bead material can suitably be fabricated from a wide range of materials such as metal or, preferably, plastic, especially an extruded thermoplastic. Also, the bead material preferably is continuous throughout the loop or channel sewn at the gas inlet opening of the air bag. The use of a continuous bead material helps facilitate the more equal distribution of the stresses accompanying bag deployment and the avoidance of undesired point loading of such stresses.

It is also to be understood that the bead material can take various shapes or forms to meet the needs of particular applications. For example, the bead material can take the form of a bar or rod and have a cross sectional shape, e.g., a circular or oval cross section, adapted to facilitate engagement with the channel portion of the diffuser. Another example of a bead material for use in the practice of the invention is the use of a fender welt shaped piece such as made of extruded plastic, for example.

In addition, the air bag thickened edge 90 includes one or more fastener holes 94 in spaced relationship and spaced to correspond to the fastener holes 86 and 88 of the diffuser face member side wall and outer flanges 68 and 72, as well as the fastener holes 38 of the housing side panels 31A and 31B.

The assembly process can perhaps more clearly be seen by reference again to FIGS. 3, 4A and 4B. As shown in FIG. 3, an air bag 14 having an opening 92 and thereabout having a thickened edge 90 containing a bead material 93 is inserted in a diffuser device 16 so that the channel portions 73 of the diffuser 16 engage with the thickened edge 90 of the air bag 14, particularly that portion thickened by way of the bead material 93 to form an air bag/diffuser subassembly 12, shown in FIG. 4A. The channel portion 73 of the diffuser is a widened portion adapted to engage with the thickened edge 90 of the air bag 14. As shown in phantom in FIGS. 7 and 9 and by means of the directional arrows in FIG. 3, after insertion of the bead material-containing thickened bag edge 90 into the diffuser channel portion 73, the side wall 68 and outer flange, are pressed or crimped together thus capturing and securing the bag 14 therebetween, forming an air bag/diffuser subassembly 12, for later inclusion, with or without the addition of additional fasteners, into an air bag module assembly.

The thus crimp secured air bag, whereby the bag in an uninflated state is connected and joined together with the diffuser device can facilitate handling and simplify assembly as the diffuser provides desired added structure to the flexible bag. That is, the formation of such an air bag/diffuser subassembly allows the subassembly to be handled by means of the relatively rigid diffuser device and thus facilitates application of various automated handling steps. For example, with such an air bag/diffuser subassembly, the relatively rigid diffuser device can be used as a point of attachment to an automated air bag folding apparatus. It is generally much easier to attach the relatively rigid diffuser device to such an apparatus, as compared to trying to attach the flexible air bag material thereto. Thus, such an air bag/diffuser subassembly permits the greater use of automation in the air bag module assembly process, such as by facilitating employment of automatic bag folding apparatuses.

Furthermore, the utilization of such air bag/diffuser subassemblies facilitates the inspection process as with such subassemblies the folded bag can be easily inspected prior to placement into the module and prior to attachment to the reaction canister as commonly occurs with conventional module assembly.

In addition, the formation of such an air bag/diffuser subassembly can further serve to facilitate the production process such as by permitting the use of such a subassembly:

1. either at a later time or a different location for the making of appropriate air bag module assemblies;
2. for different air bag module assemblies, e.g., module assemblies having different types or kinds of inflator or reaction canister.

In practice, fasteners can be used to secure such an air bag/diffuser subassembly to the reaction housing in the final module. An especially preferred means of fastening whereby the air bag is secured not only into the air bag/diffuser subassembly but also to the reaction housing is shown in the detail drawing FIG. 2 and FIG. 4B. These figures show an air bag/diffuser subassembly 12 wherein the thickened bag edge 90, containing a bead material 93, has been inserted into the diffuser channel portion 73 and the side wall 68 and the outer flange 72, respectively, of the diffuser 16 have been crimped together. After an initial alignment of the fastener holes 94 of the air bag thickened edge 90 with the fastener holes 86 and 88 of the side wall 68 and outer flange 72 of the diffuser 16 and upon proper crimping of the side wall 68 and outer flange 72, the crimp retained bag is retained in the air bag/diffuser subassembly 12 with the fastener holes 94, 86 and 88 in proper alignment to permit the placing of the subassembly 12 into the reaction housing canister 24 whereby the fastener holes 38 of the housing side panels 31A and 31B are also aligned with the fastener holes of the air bag 14 and the diffuser 16. It is then a simple matter of placing a selected fastener 96 through aligned fastener holes 38, 88, 94 and 86, respectively, as a means of further securing the assembly.

Examples of the fasteners that can be used in the practice of the invention include rivet and screw fasteners. With respect to the appropriate selection of such fasteners for use, it is noted that designs utilizing rivet fasteners in practice generally require that the fastener holes be cut relatively precisely and also that the fastener holes in the parts to be fastened must generally be relatively precisely aligned. Thus, in such fastening, the use of conventional screws as opposed to rivets generally facilitates the assembly process such as by permitting the use of oversized fastener holes in the materials being fastened, e.g., in the materials being fastened between the thread bearing material and the screw head. The use of oversized fastener holes facilitates the alignment of the fastener holes in the parts to be fastened together. In addition, screws typically cost less than comparably sized rivets. Also, conventional screw fasteners advantageously generally provide greater clamp load than do corresponding rivet fasteners. Unfortunately, conventional screw fasteners tend to become more easily loosened after assembly when applied in high stress uses, such as are frequently associated with air bag deployments.

The swaging screw is a form of fastener that has been found to have particular utility in the practice of the invention. Swaging screw fasteners generally form or swage a thread into fastener holes upon insertion. (The swaging process produces a removal torque in excess of 80% of the screw setting torque.) Such thread formation generally occurs as a result of a stretching or a displacement of the material, typically metal, into which it is inserted, as opposed to a general removal of such material as commonly occurs when using a conventional thread cutting screw fastener. Also, as the fasteners are for use in conjunction with component parts of a vehicular inflatable restraining system, the use of a thread cutting screw fastener can result in the formation of fine metal filings which are undesirable and not easily removed. In contrast, as described above, such metal filings are generally not created with swaging screw fasteners. The use of swaging screw fasteners allows the fastener holes in the side walls of the face member of the diffuser to be formed by simple extrusion during the manufacture process, with the swaging screw fastener forming the threading during insertion. In general, extrusion will be a preferred means to form holes as such hole formation is more conducive to tooling control.

Preferably, the air bag is stored in an uninflated, folded form between the diffuser and the cover, the bag then deploys and inflates in response to the gases directed to it on initiation of the gas generator. The inflated air bag thereupon forms a load distributing and energy-absorbing structure for interaction with and in protection of the occupant(s) of the subject vehicle during a crash event.

In practice, the air bag can typically be fabricated of a woven material such as coated or uncoated polyester, or polyamide fiber such as nylon 6 or nylon 6,6, for example. It is to be understood, however, that the practice of the invention is not limited to the use of air bags fabricated of any particular material or by any particular process.

In general, the diffuser can take whatever shape and/or size required by the particular use, with the size generally determined by the size of the inflator and the size of the bag to be attached thereto.

Figure 5:
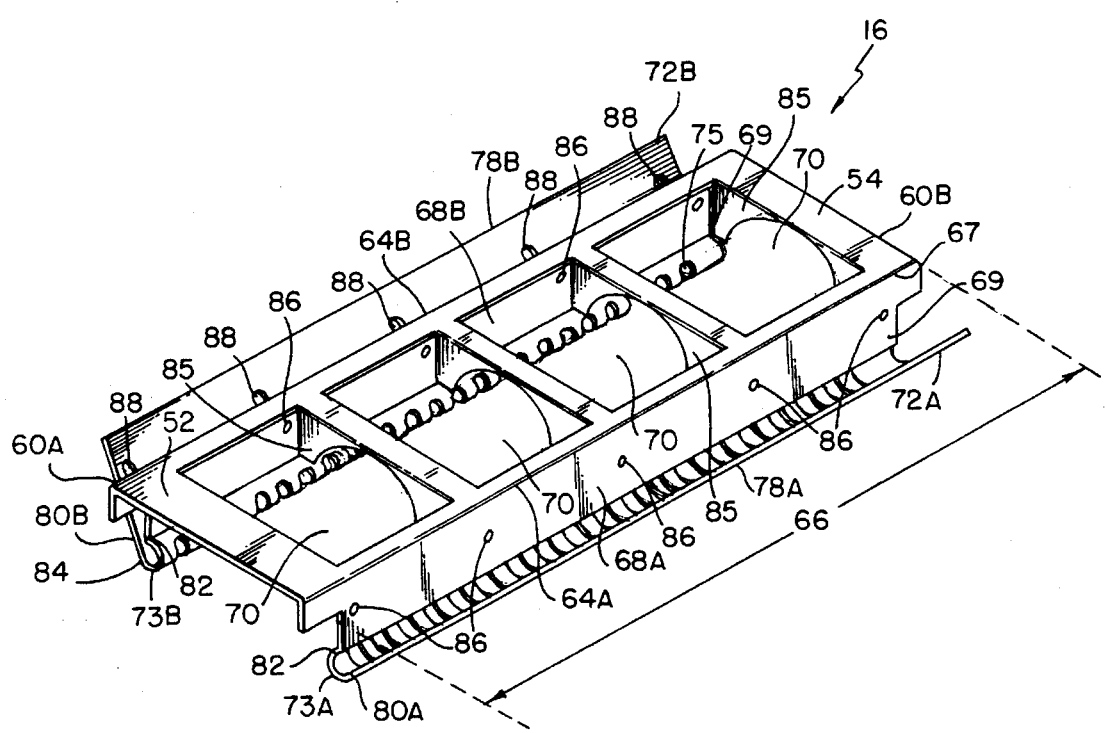
FIG. 5 is a perspective schematic of a diffuser device in accordance with one embodiment of the invention.

FIG. 5, FIGS. 6 and 7, FIGS. 8 and 9, and FIGS. 10 and 11, illustrate some preferred diffuser embodiments. For example, FIG. 5 illustrates a diffuser 16 having as apertures 70 four equally spaced rectangular openings of similar size. In contrast, the diffuser 16 illustrated in FIGS. 6 and 7 has apertures that differ in both size and shape. For example, this diffuser 16 includes: a) nine smaller similarly sized circular openings 102 aligned in three rows of three openings each with two of these rows near the lateral side 60A, b) three spaced generally rectangular openings 104 of similar size and c) two groupings of four larger circular openings 106.

Figure 6:
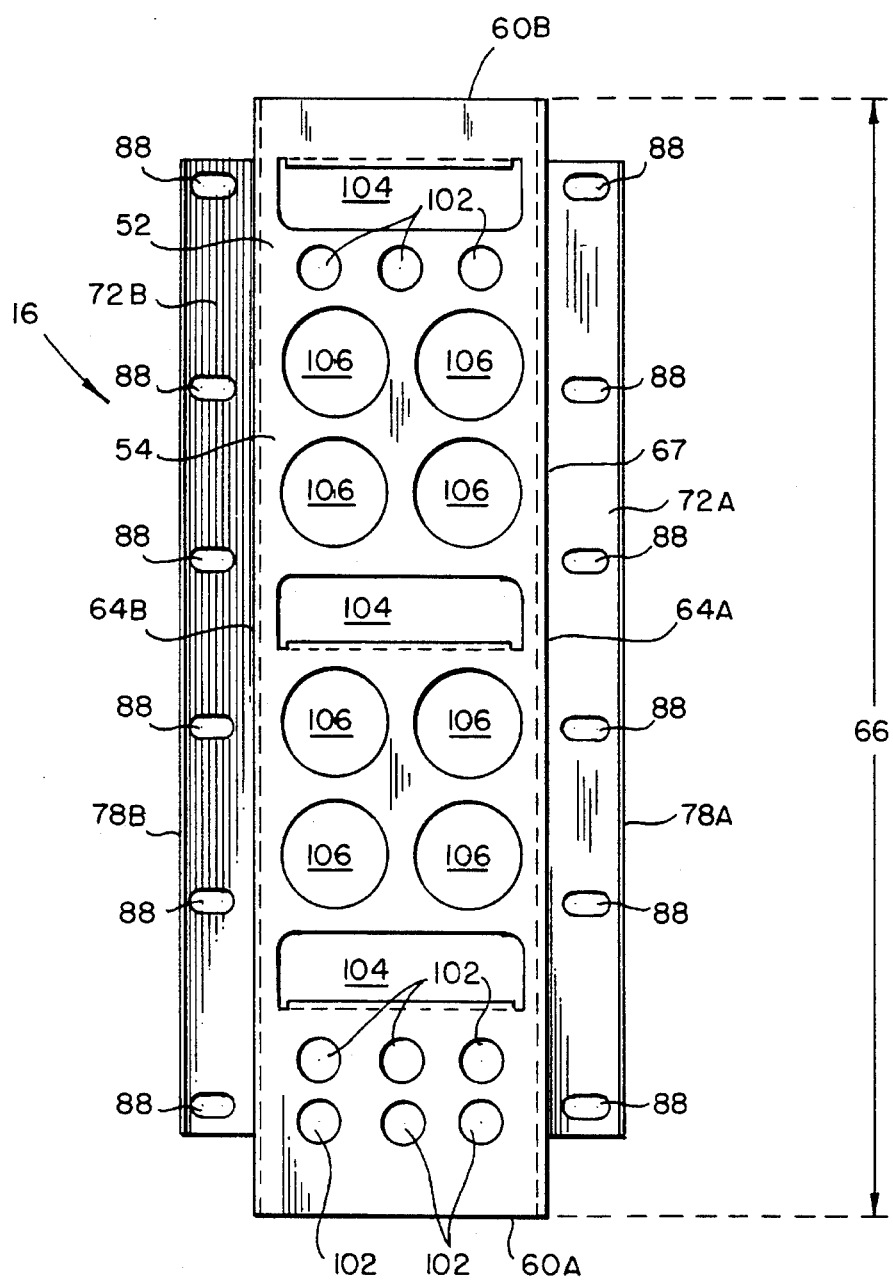
FIG. 6 is a top plan view of a diffuser device in accordance with an alterative embodiment of the invention.
Figure 7:
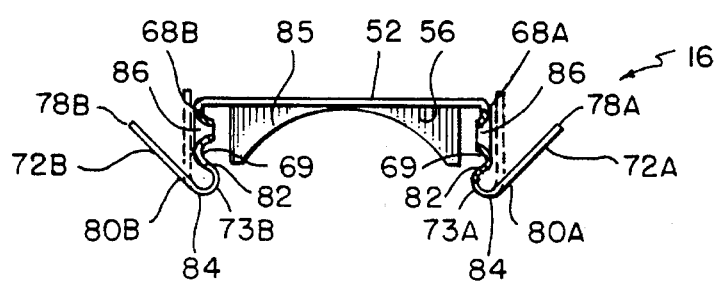
FIG. 7 is a side view of the diffuser device of the FIG. 6.
Figure 8:
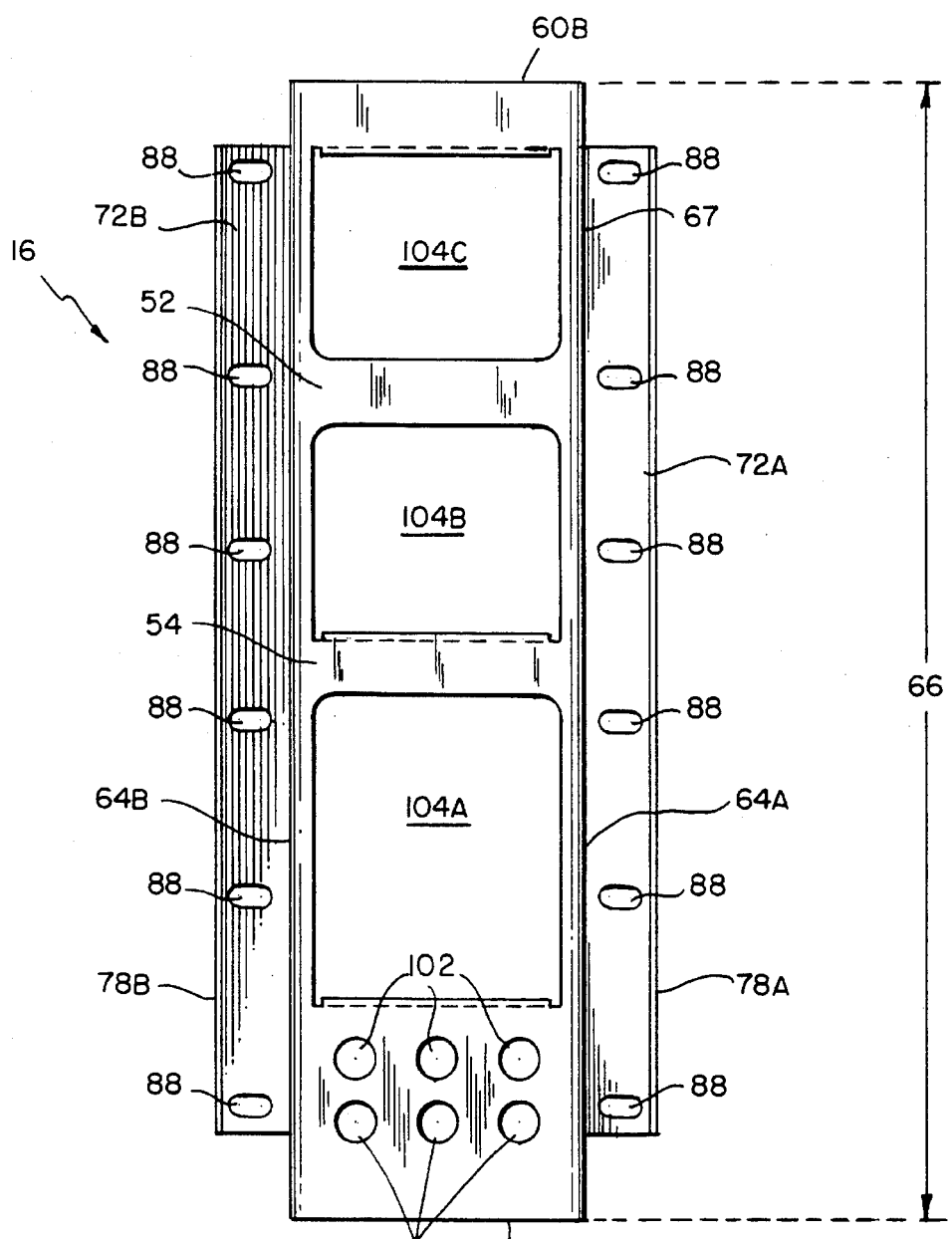
FIG. 8 is a top plan view of a diffuser device in accordance with yet another alternative embodiment of the invention.
Figure 9:
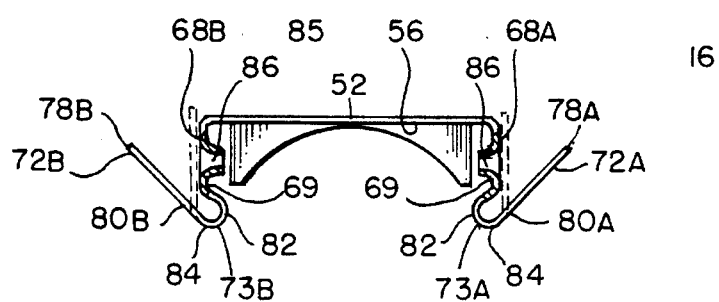
FIG. 9 is a side view of the diffuser device of FIG. 8.

The diffuser 16 illustrated in FIGS. 8 and 9 includes two rows of three similarly sized smaller circular openings 102 near the lateral side 60A, like the diffuser of FIGS. 6 and 7. The diffuser of FIGS. 8 and 9 also has three spaced generally rectangular openings 104 but these openings, individually identified also with a capital letter A, B, or C, vary in size and general shape.

Figure 10:
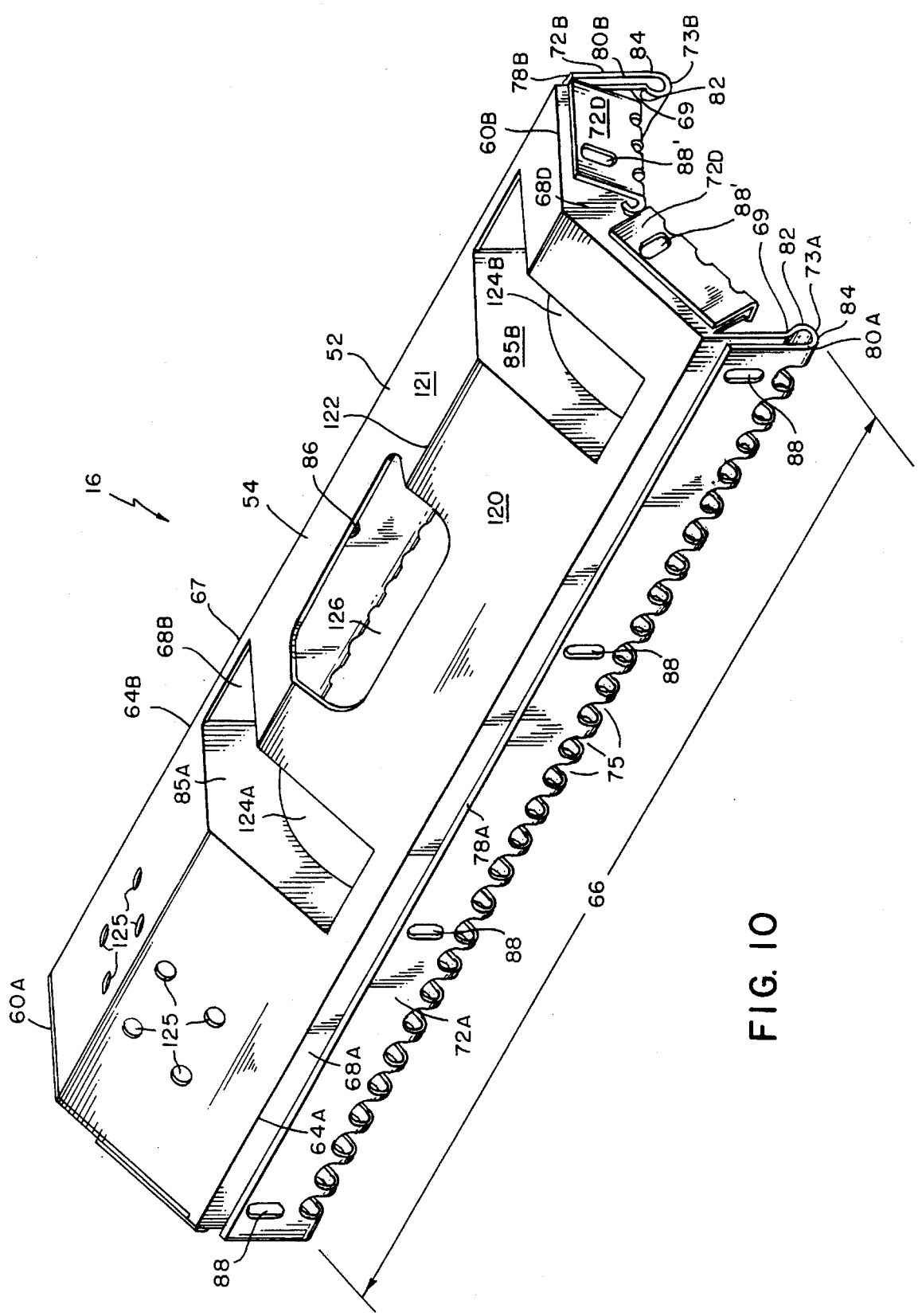
FIG. 10 is a perspective schematic from a top angle of a diffuser device in accordance with yet another embodiment of the invention.
Figure 11:
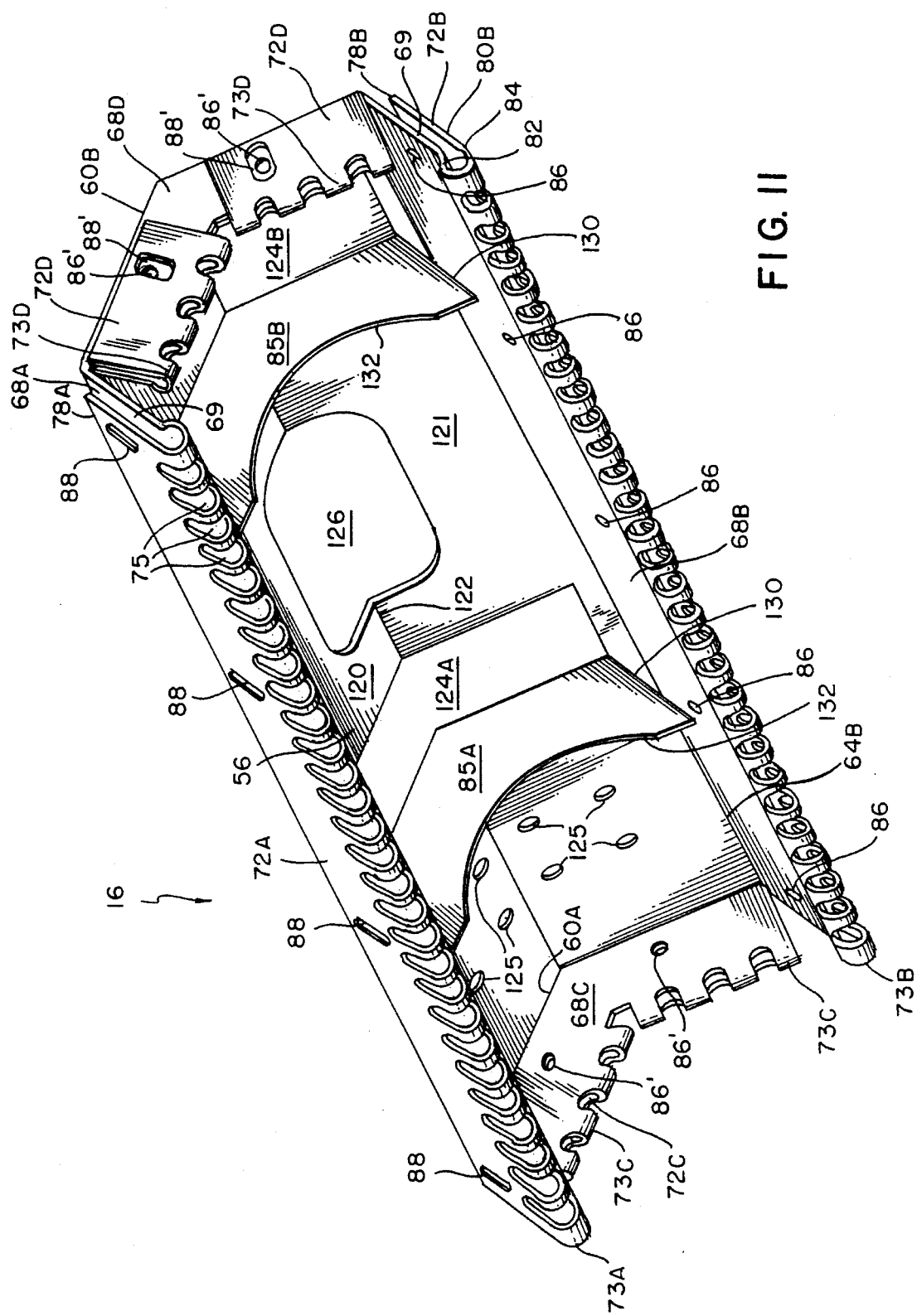
FIG. 11 is a perspective schematic from a bottom angle of the diffuser device of FIG. 10.

The diffuser 16 illustrated in FIGS. 10 and 11 is similar to the diffuser embodiments described above and includes a face member 52, an outer flange 72, and a channel portion 73.

The face member 52 of this diffuser has an angular cross section, e.g., the face member has two planar members 120 and 121 which come together at the line 122, with each of the planar members 120 and 121 displaced from the horizontal, as will be described in more detail below. Such a diffuser, by means of having such a face member of angular cross section, permits the making of geometrically smaller modules as the diffuser can be more closely assembled to the inflator without undesirably touching the inflator.

This face member 52 includes the gas flow directing means of apertures including: a) two rectangular openings 124A and 124B, b) two rows of four small circular openings 125 near lateral side 60A, as well as c) an oblong opening 126 running lengthwise along the line 122 where at the planar members 120 and 121 join together. The rectangular openings 124A and 124B each immediately follow a baffle, shown as baffles 85A and 85B, respectively. As perhaps can be more clearly seen in FIG. 11, the baffles 85A and 85B each include edges 130 and a bottom 132. The baffle edges 130 are shown joined to the adjacent side walls 68. Such joining together of the baffles and adjacent side walls, such as by welding, assists in controlling and limiting any movement by the baffles when the device is subjected to high rates of gas flow, as occurs during activation and bag deployment. The bottom 132 of the baffles are preferably designed to be compatible with the inflator used in the module. For example, where the inflator has a circular cross section, the bottom of the baffles will preferably be arc shaped to correspond to the shape of the inflator. In this way, the diffuser device can be situated closely to the inflator in the module, thereby minimizing space requirements as well as potentially increasing the gas flow directing benefits to be realized through the use of the baffles.

The face member 52 of this diffuser embodiment includes side walls 68C and 68D having fastener holes 86' along the lateral sides 60A and 60B, respectively. In addition, this embodiment of diffuser is equipped with, outer flanges 72, shown as outer flanges 72C and 72D, having fastener holes 88' and channel portions 73, shown as channel portions 73C and 73D, along the lateral sides 60 of the diffuser in addition to those, as described above with reference to the embodiment of FIG. 1, along the longitudinal sides 64. The use of such attachment/securement features along the lateral as well as longitudinal sides especially where such features include additional corresponding fastener holes are particularly useful when seeking to ensure generally uniform sealing of the air bag to the diffuser on the lateral as well as longitudinal sides of the diffuser. Also, the use of such attachment/securement features along the lateral as well as longitudinal sides further secures the assembly by fastening the air bag/diffuser subassembly to the end plates as well as the side panels of the canister.

A diffuser, such as that illustrated in FIGS. 10 and 11, is particularly suited for use in modules having inflators which generally require gas redirection such as inflators that discharge gas from one side or end including, for example, various hybrid, stored gas, and combustible gas inflators. The diffuser shown in FIGS. 10 and 11 can, for example, be used with a hybrid inflator wherein the gas discharge end of the inflator is towards the lateral end 60A. In general, it is desired that the gas flow areas through the face member 52, i.e., the apertures 70, increase as the distance from the inflator discharge port increases, in this way a more uniform distribution of flow of gas along the length of the diffuser may be realized.

Figure 12:
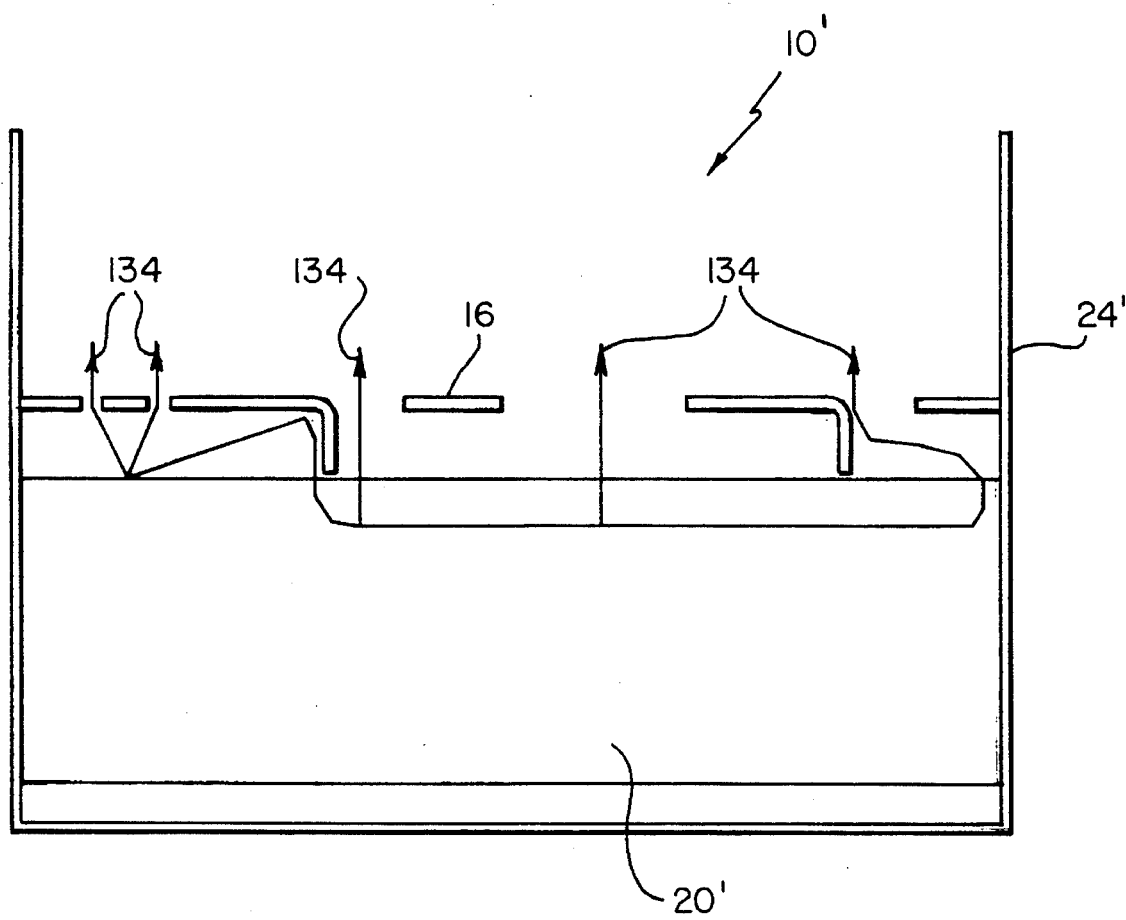
FIG. 12 is a simplified schematic side view of an air bag module assembly including the diffuser device of FIGS. 10 and 11 and an end discharge inflator.

FIG. 12 illustrates an air bag module assembly 10' wherein the diffuser 16 illustrated in FIGS. 10 and 11 is used in a reaction canister 24' in combination with an end discharge inflator 20'. Gas flow in the canister 24' from the inflator 20' and through the diffuser 16 is shown by the arrows 134.

The diffuser 16 illustrated in FIGS. 10 and 11 advantageously includes as apertures the rectangular openings 124A and 124B immediately following the baffles 85A and 85B, respectively, as viewed in the longitudinal direction going from the lateral side 60A to the lateral side 60B. Such a design is suitable for use in making the diffuser device from a single flat pattern of a suitable material, such as steel or aluminum, in that the material which forms the baffle can be material that was cut and bent from the flat pattern, permitting the simultaneous making of each pair of baffle and opening, i.e., the pair of the baffle 85A and the opening 124A and the pair of the baffle 85B and the opening 124B. It being understood that, if desired and as described above, the baffle edges 130 can be joined to the adjacent side walls 68 such as by welding whereby a weld can be used to bridge the space which may occur between the baffle edges and the side wall when the diffuser device is formed from a single flat pattern of material.

The diffuser device of the invention provides a restricting tie between the top and bottom panels of the reaction can, thus controlling bell-mouthing and maintaining the integrity of the reaction can. By virtue of this type of attachment, the air bag deployment reaction forces are restrained at the mouth portion of the reaction housing assembly thereby reducing deformation of the assembly and preventing damage to closely spaced portions of the vehicle such as the instrument panel. By virtue of the subject diffuser, this advantage can be realized without a significant increase in the weight of the assembly.

As described above, after deployment of the air bag, the inflator is typically very hot. The diffuser serves as a barrier between the hot inflator and the extremities of the vehicular occupants. Further, the diffuser serves to prevent the deployed bag from settling back upon the inflator and melting. In addition, the apertures or openings in the face member of the diffuser can be specifically tailored to control the direction of the gas flow and to achieve specified and desired bag deployment geometry as will be apparent to those skilled in the art. Further, as described herein, gas diffusion and distribution can be aided and facilitated by means of baffles to direct the flow of gas. In view thereof, the apertures in the face member can vary in size, shape and arrangement.

The practice of the invention is not limited to use in conjunction with inflators of particular modes of operation. Thus, the invention can suitably be practiced with either pyrotechnic or hybrid inflators, for example.

It is to be understood that references herein to the fabrication of the diffuser device from a single flat pattern of material does not require the material to be absolutely flat, rather such reference is made relative to conventional sheet materials such as sheets of steel or aluminum, for example. Further, fabrication of subject diffuser devices from multiple parts, pieces or materials is not precluded.

The foregoing detailed description is given for clearness of understanding only, and no unnecessary limitations should be understood therefrom, as one skilled in the art can easily ascertain the essential characteristics of this invention and, without departing from the spirit and scope thereof, can make various changes and modifications to adapt the invention to various usages and conditions and, as understood, such changes and modifications are within the scope of the invention.

What is claimed is:

1. In an air bag module assembly comprising an inflator that discharges gas from one end thereof, a diffuser device for an inflatable restraint system air bag module which includes an open-mouthed reaction canister housing having first and second side panels, an air bag inflator, and an air bag for the restraint of a vehicle occupant, the diffuser device comprising:
- a face member portion having a longitudinal length with a peripheral edge defined thereabout;
- an integrally formed side wall about at least a portion of said peripheral edge;
- an Outer flange oppositely positioned and angularly disposed relative to at least a portion of said side wall; and
- a channel portion, bridging said side wall and said oppositely positioned and angularly disposed outer flange, adapted to engage a thickened edge of the air bag,
- the diffuser device also comprising gas flow directing means including a plurality of apertures in said face member portion permitting inflation gas to flow through said face member portion, with the longitudinal length of said face member portion being generally perpendicular to the direction of gas flow through said face member portion, said diffuser device forming a barrier between the inflator and both the air bag and vehicle occupant and a restricting tie between the first and second side panels of the reaction canister housing,
- wherein said gas flow directing means results in uniform distribution of gas flow through said apertures along the longitudinal length of said face member portion.

2. The diffuser device of claim 1 fabricated from a single flat pattern of ductile metal.

3. The diffuser device of claim 1 for use in a passenger side air bag module assembly wherein the air bag is a passenger side air bag.

4. The diffuser device of claim 1 wherein said side wall and outer flange are crimpable after said channel portion has engaged the thickened edge of the air bag, to secure said diffuser and bag in a single assembly.

5. The diffuser device of claim 1 wherein said face portion has an angular cross section.

6. A diffuser device for an inflatable restraint system air bag module which includes an open-mouthed reaction canister housing having first and second side panels, an air bag inflator, and an air bag for the restraint of a vehicle occupant, the diffuser device comprising:
- a face member portion having a longitudinal length with a peripheral edge defined thereabout;
- an integrally formed side wall about at least a portion of said peripheral edge;
- an outer flange Oppositely positioned and angularly disposed relative to at least a portion of said side wall; and
- a channel portion, bridging said side wall and said oppositely positioned and angularly disposed outer flange, adapted to engage a thickened edge of the air bag,
- the diffuser device also comprising gas flow directing means including a plurality of apertures in said face member portion permitting inflation gas to flow through said face member portion, with the longitudinal length of said face member portion being generally perpendicular to the direction of gas flow through said face member portion, said diffuser device forming a barrier between the inflator and both the air bag and vehicle occupant and a restricting tie between the first and second side panels of the reaction canister housing,
- wherein the inflator is a hybrid inflator, said gas flow directing means additionally includes at least one baffle formed onto the underside of said face member portion, said baffle serving to redirect gas flow through the device.

7. A diffuser device fabricated from a single flat pattern for use in a passenger side air bag module assembly having an inflator for which gas redirection is desired, said diffuser device comprising:
- a face member portion with an angular cross section and having a topside, an underside, at least two opposed lateral sides, at least two opposed longitudinal sides, with a peripheral edge defined about said lateral and longitudinal sides, said member portion also comprising gas flow directing means including a plurality of apertures therethrough to permit a gas to flow through the member portion, with the longitudinal length of said face member portion being generally perpendicular to the direction of gas flow therethrough and with said gas flow directing means also including at least one baffle formed onto said underside and serving to redirect gas flow through the member portion;
- an integrally formed side wall about at least a portion of said peripheral edge;
- an outer flange oppositely positioned and angularly disposed relative to at least a portion of said side wall; and
- a channel portion, bridging said side wall and said oppositely positioned and angularly disposed outer flange, adapted to engage a thickened edge of an air bag.

8. The diffuser device of claim 7 wherein said inflator comprises a hybrid inflator.

9. The diffuser device of claim 8 wherein said portion of said peripheral edge having said integrally formed side wall includes at least said two opposed lateral sides.

10. The diffuser device of claim 7 wherein said side wall and outer flange are crimpable after said channel portion has engaged the thickened edge of the air bag, to secure said diffuser and bag in a single assembly.

11. The diffuser device of claim 7 wherein said portion of said peripheral edge having said integrally formed side wall includes at least said two opposed longitudinal sides.

12. An air bag/diffuser subassembly comprising:
a) a diffuser comprising,
  i) a face member portion having a longitudinal length with a peripheral edge defined thereabout;
  ii) an integrally formed side wall about at least a portion of said peripheral edge;
  iii) an outer flange oppositely positioned and angularly disposed relative to at least a portion of said side wall;
  iv) a channel portion bridging said side wall and said oppositely positioned and angularly disposed outer flange, adapted to engage a thickened edge of an air bag; and
  v) gas flow directing means including a plurality of apertures in said face member portion permitting gas to flow through said face member portion, with the longitudinal length of said face member portion being generally perpendicular to the direction of gas flow through said face member portion; and
b) an inflatable air bag having a thickened edge at its opening, said thickened edge being engaged by said channel portion of said diffuser, for use in an air bag module assembly comprising a hybrid inflator, said gas flow directing means additionally includes at least one baffle formed onto the underside of said face member portion, said baffle serving to redirect gas flow through the device.

13. The air bag/diffuser subassembly of claim 12 wherein said side wall and outer flange are crimpable after said channel portion has engaged the thickened edge of the air bag, to secure said diffuser and bag in a single assembly.

14. The air bag/diffuser subassembly of claim 12 wherein said thickened edge comprises a bead material.

15. The air bag/diffuser subassembly of claim 12 wherein said bead material is continuous about the gas inlet opening of said air bag.

16. The air bag/diffuser subassembly of claim 12 wherein said bead material has a cross sectional shape adapted to facilitate engagement with the channel portion of the diffuser.

17. For use in an inflatable air bag restraint system for use in a motor vehicle, an air bag module assembly comprising:
   a) an air bag/diffuser subassembly comprising,
      i) a diffuser having,
         a face member portion having a longitudinal length with a peripheral edge defined thereabout;
         an integrally formed side wall about at least a portion of said peripheral edge;
         an outer flange oppositely positioned and angularly disposed relative to at least a portion of slid side wall; and
         a channel portion, bridging said side wall and said oppositely positioned and angularly disposed outer flange, adapted to engage a thickened edge of an air bag,
         the diffuser also comprising gas flow directing means including a plurality of apertures in said face member portion permitting gas to flow therethrough, with the longitudinal length of said face member portion being generally perpendicular to the direction of gas flow through said face member portion; and
      ii) an inflatable air bag having a thickened edge at its opening, said thickened edge being engaged by said channel portion of said diffuser;
   b) means for inflating the bag and for which inflating means gas redirection is desired;
   c) a housing containing said air bag/diffuser subassembly and said inflating means; and
   d) means for securing said housing in said motor vehicle and
   wherein in said air bag module assembly, said gas flow directing means results in uniform distribution of gas flow through said apertures along the longitudinal length of said face member portion and
   wherein said diffuser additionally includes at least one baffle formed onto the underside of said face member portion.

18. The air bag module assembly of claim 17 wherein said baffle includes an edge joined to an adjacent side wall of the face member.

19. The air bag module assembly of claim 17 wherein fastening means comprising a plurality of fasteners are used to secure said air bag/diffuser subassembly to said housing.

20. The air bag module assembly of claim 19 wherein said fastening means provide a continuous equally distributed retention of the bag along the thickened edge thereof.

21. The air bag module assembly of claim 19 wherein said fasteners comprise swaging screw fasteners.

* * * * *

UNITED STATES PATENT AND TRADEMARK OFFICE
CERTIFICATE OF CORRECTION

PATENT NO. : 5,470,105
DATED : 28 November 1995
INVENTOR(S) : Larry D. Rose et al.

It is certified that error appears in the above-indentified patent and that said Letters Patent is hereby corrected as shown below:

At column 15, line 6, "an Outer flange" should be
--an outer flange--.

At column 15, line 44, "flange Oppositely" should be
--flange oppositely--.

At column 17, line 18, "of slid side" should be
--of said side--.

Signed and Sealed this

Second Day of July, 1996

*Attest:*

BRUCE LEHMAN

*Attesting Officer*  Commissioner of Patents and Trademarks